(12) United States Patent
Ito

(10) Patent No.: US 6,803,137 B2
(45) Date of Patent: Oct. 12, 2004

(54) FUEL CELL

(75) Inventor: Yasumitsu Ito, Hamamatsu (JP)

(73) Assignee: Suzuki Motor Corporation (JP)

( * ) Notice: Subject to any disclaimer, the term of this patent is extended or adjusted under 35 U.S.C. 154(b) by 140 days.

(21) Appl. No.: 09/884,002

(22) Filed: Jun. 18, 2001

(65) Prior Publication Data

US 2002/0034671 A1 Mar. 21, 2002

(30) Foreign Application Priority Data

Jun. 19, 2000 (JP) ......................................... 2000-182612

(51) Int. Cl.⁷ .............................. H01M 8/10; H01M 2/14
(52) U.S. Cl. .............................. 429/30; 429/34; 429/38; 429/44; 429/33
(58) Field of Search ............................. 429/30, 34, 38, 429/32, 18, 33, 44

(56) References Cited

U.S. PATENT DOCUMENTS

| | | | |
|---|---|---|---|
| 5,338,412 A | * | 8/1994 | Burk et al. .................... 204/59 |
| 5,399,184 A | * | 3/1995 | Harada ........................ 29/623.4 |
| 6,103,078 A | * | 8/2000 | Hitchems et al. ........... 204/296 |
| 6,127,059 A | * | 10/2000 | Kato ............................. 429/40 |

FOREIGN PATENT DOCUMENTS

WO    WO 0017952    3/2000    ............ H01M/8/04

* cited by examiner

*Primary Examiner*—Stephen Kalafut
*Assistant Examiner*—Raymond Alejandro
(74) *Attorney, Agent, or Firm*—Myers Bigel Sibley & Sajovec PA

(57) ABSTRACT

A solid polymer fuel cell which had a plurality of unit cells stacked one after another includes an electrode of an anion exchange membrane and an electrode of a cation exchange membrane disposed adjacent but not in contact with each other, gas diffusion layers commonly disposed on both sides of these electrodes for allowing electrons generated on the catalysts to pass, and interconnectors which are disposed outside the gas diffusion layers and serve as a current carrier having a gas channel.

17 Claims, 4 Drawing Sheets

FIG.2(a)
FIG.2(b)
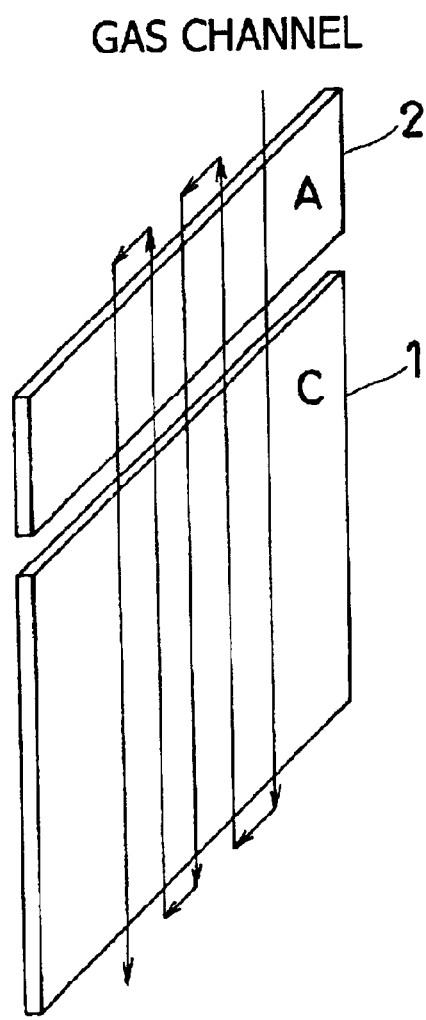
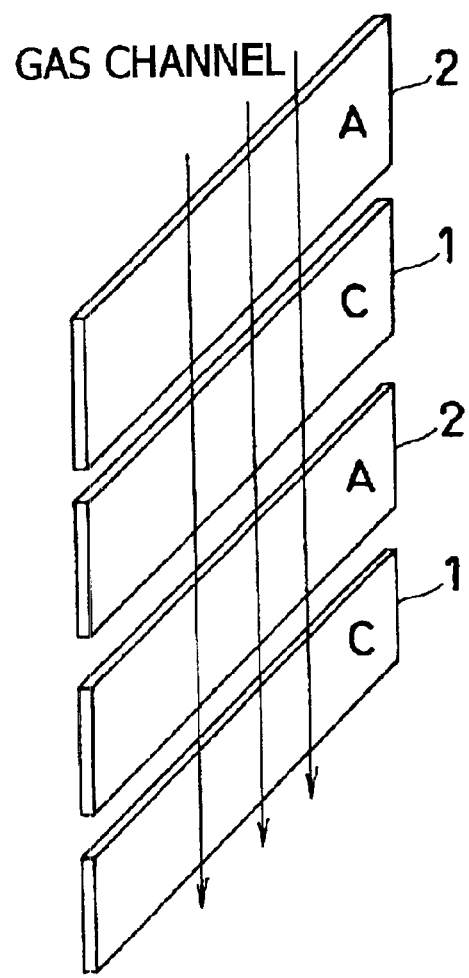

FUEL CELL

CROSS-REFERENCE TO RELATED APPLICATIONS

The present application claims priority to Japanese Patent Application No. 2000-182612 filed Jun. 19, 2000, the disclosure of which is incorporated by reference herein in its entirety.

BACKGROUND OF THE INVENTION

1. Field of the Invention

The present invention relates to a self humidifying type fuel cell system. More specifically, the invention pertains to an ion-exchange-membrane-equipped solid polymer fuel cell having a cation exchange membrane and an anion exchange membrane.

2. Description of the Related Art

There are several kinds of fuel cells. Among them, a solid polymer type fuel cell is compact and is capable of generating electricity even at a relatively low temperature.

The body of a solid polymer type fuel cell is a stack having a plurality of cells stacked over each other. As illustrated in FIG. 4, unit cells in the stack are connected and stacked in series through an interconnector 9 which is electrically conductive and gas impermeable plate.

As an ion exchange membrane 11 constituting the main part of the solid polymer fuel cell, a cation exchange membrane called a "proton exchange membrane" is generally used. In the unit cell which is a basic component of a fuel cell, catalysts 7,8 are held on both sides of this proton exchange membrane 11 (proton conductive polymer film) and a gas diffusion layer 3 is disposed on the outside of each of the catalysts. This diffusion layer 3 is usually made of carbon paper and it serves as a collector layer which allows to pass therethrough electrons generated on the catalysts or a carbon-made electrode (hydrogen electrode oxygen electrode). As the above-described catalyst, metal catalysts such as platinum are used. Catalyst layers 7,8 are formed, for example, by having such a metal catalyst born on carbon particles and then mixing it with an electrically conductive polymer serving as a binder.

On the outside of each of the above-described unit cells, there exists a plate having a gas channel disposed therein and it is called "interconnector" 9. A reactant gas is fed from gas channels 4,5 disposed in the interconnector 9 and the electricity-generating capacity of the cell is determined by a fuel gas and an oxidizing gas to be fed. There are two gas flow channels, one is the channel 4 for feeding and discharging a fuel gas therethrough and the other one is the channel 5 for feeding and discharging an oxidizing gas therethrough. Accordingly, the interconnector has, on one side thereof, a face having the gas channel for feeding a fuel gas and, on the other side, a face having the gas channel for feeding an oxidizing gas.

The interconnector 9 is a current-carrying substance equipped with a function of separating a fuel gas and an oxidizing gas as illustrated in FIG. 4. The term "fuel gas" as used herein means a gas usually composed of a hydrogen gas and water vapor. The catalyst layer which is in contact with this hydrogen-gas-containing fuel gas is called "hydrogen electrode". The term "oxidizing gas" as used herein means an oxygen containing gas such as air and the catalyst layer which is in contact with the oxidizing gas is called "oxygen electrode".

When this solid electrolyte fuel cell is connected with an external load, a hydrogen gas is decomposed into protons and electrons at the hydrogen electrode and transfers through an electrolytic membrane toward the side of oxygen electrode. At this time, protons transfer in clusters, together with water molecules near these protons. This is so called electroendosmosis of water. By this phenomenon, the hydrogen electrode side of the membrane dries out.

In order to overcome the above-described problem, the hydrogen gas at the hydrogen electrode is usually fed in the externally humidified form, which suppresses an increase in the electric resistance due to drying of the membrane.

In order to attain a sufficient water vapor pressure, it is necessary to heat the hydrogen gas. It is however known that an excessive temperature increase heightens the water vapor partial pressure of a hydrogen/water vapor gas mixture, which exerts a bad influence on the supply of a hydrogen gas itself necessary for the reaction.

With the foregoing in view, various membranes for a fuel cell have been studied.

In a fuel cell, protons introduced into the side of the oxygen electrode react with oxygen on the electrode and generate water. This product water must be discharged outside promptly, together with water generated by electroendosmosis, because excess water clogs therewith the gas diffusion channel of the adjacent diffusion layer, thereby decreasing an effective electrode area. These waters are diffused toward the hydrogen electrode side in accordance with a moisture concentration gradient provided by the hydrogen electrode side. This phenomenon is generally called "back diffusion".

It is the common practice to promote the back diffusion of water by decreasing the thickness of the membrane, thereby raising this concentration gradient. This method makes it possible to relax humidifying conditions while reducing humidification as much as possible.

When the membrane is thinned, however, about 1% of a hydrogen gas physically passes through the membrane, resulting in a problem such as a decrease in an electromotive force.

Various methods have been attempted for internal humidification. The first method is to obtain a necessary moisture amount by dispersing, in a membrane, a predetermined amount of a catalyst similar to that dispersed on the surface of the electrode catalyst, trapping hydrogen and oxygen which pass through the catalyst-dispersed membrane and generating water inside of the fuel cell. This method also involves a problem in lowering of the electromotive force. In addition, this method presumably causes lowering in the performance owing to a deterioration of the membrane caused by pin holes formed inside of the membrane by the heat upon reaction.

The second method is to mechanically trap moisture at the outlet of the stack and circulating it to the humidifying portion of the upstream stage of the stack. The term "stack" is a unit module having a plurality of unit fuel cells stacked one after another. This method is however accompanied with the problem that the mechanism of this method which traps water at the downstream stage of the stack inevitably enlarges the apparatus and makes it unsuitable as a mobile fuel cell.

The third method is to dispose a cooling passage on the side opposite to the hydrogen channel of the interconnector, and diffuse water to the interconnector itself, thereby humidifying the hydrogen on the opposite side. A carbon material is ordinarily employed for the interconnector, but the interconnector without any treatment allows a hydrogen gas to penetrate therethrough. Its gas tightness is therefore heightened by immersing it in a polymer such as phenol resin. It is however not easy to produce an interconnector which has, in good balance, improved hydrogen-gas tightness and capacity of diffusing water, thereby humidifying hydrogen.

SUMMARY OF THE INVENTION

With the problems in view, the present inventors have carried out an extensive investigation with a view to developing a self-humidifying type fuel cell system which, without using auxiliary equipment such as humidifier, can feed a reactant gas with water while controlling excessive increase of water.

As a result, it has been found that the above-described problems can be overcome by employing a self humidifying type fuel cell system wherein internal circulation of water is carried out using an anion exchange membrane MEA (membrane electrode assembly) and a cation exchange membrane MEA disposed alternately, and electroendosmotic water and product water are used while being circulated by the transfer of ions in the directions opposite to these membranes.

The present invention has been completed based on such a view.

An object of the present invention is to provide a solid polymer fuel cell system having a plurality of unit cells stacked one after another, each unit cell comprising an electrode of an anion exchange membrane and an electrode of a cation exchange membrane disposed adjacent but not in contact with each other, gas diffusion layers commonly disposed on both sides of these electrodes for allowing electrons generated on the catalysts to pass, and interconnectors which are disposed outside the gas diffusion layers and serve as a current carrier having a gas channel.

In the fuel cell system of the present invention, the gas channel for feeding a gas inside of the unit cell is disposed to connect the portion of the gas diffusion layer contiguous to the anion exchange membrane with the portion of the gas diffusion layer contiguous to the cation exchange membrane.

The present invention makes it possible to save auxiliary equipment such as humidifier, leading to simplification of the system due to a decrease in the number of parts or apparatuses, cost reduction and saving of the space.

In the fuel cell system of the present invention, an externally introduced gas is not affected by water vapor partial pressure increased by humidification. In addition, by the use of a cation exchange membrane and an anion exchange membrane, the water generation side and electroendosmotic side is reversed so that moisture necessary for reaction is available by the humidification at the upstream stage. Moreover, owing to the transference difference between $OH^-$ ions and $H^+$ ions, properties of the membrane can be changed by a difference in the area or thickness of the membrane.

Excess or shortage of humidity can be grasped by measuring the output voltage. This fuel cell system can be operated without any external humidification means under appropriate operating conditions. A circulation ratio of water can be adjusted by a flow rate or temperature of mainly air within a range not causing a flooding phenomenon which prevents smooth gas flow by excess water.

The present invention will hereinafter be described more specifically by embodiments. It should however be borne in mind that the scope of the present invention will not be limited to or by them.

BRIEF DESCRIPTION OF THE DRAWINGS

FIG. 2 is a schematic block diagram illustrating another disposal example of the ion exchange membrane used in the present invention;

Figure 1:
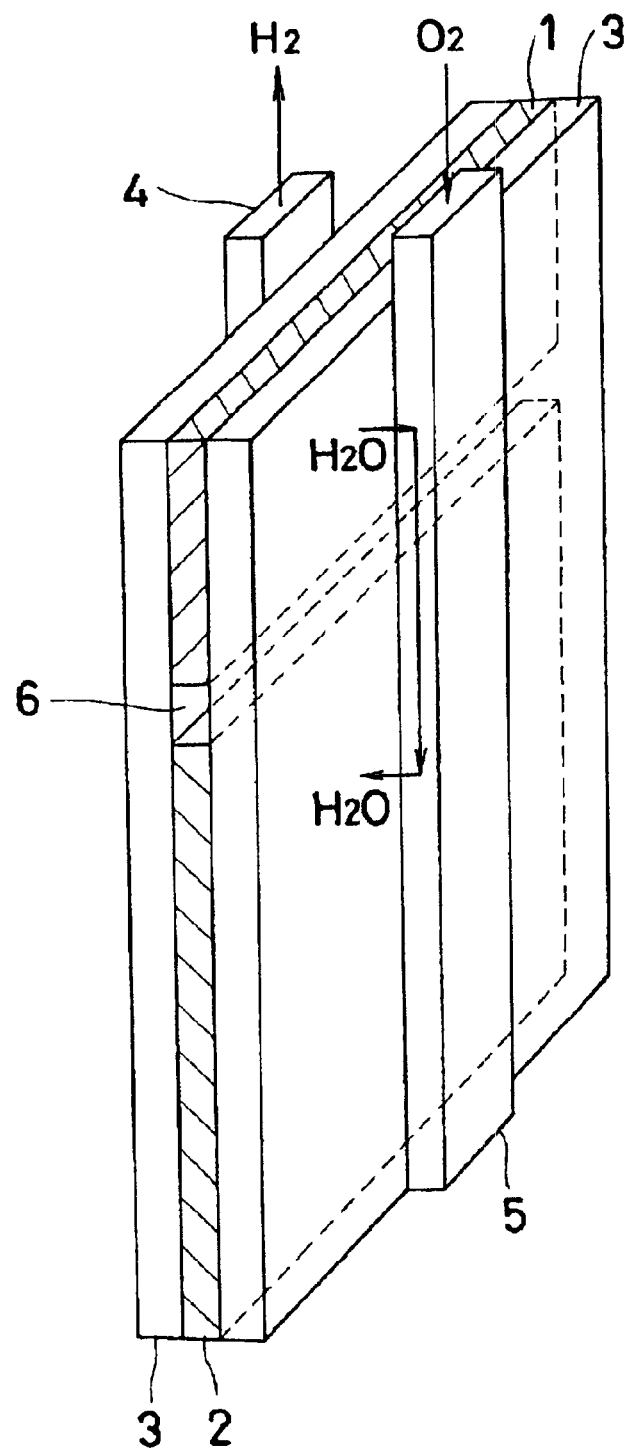
FIG. 1 is a perspective block diagram illustrating one example of a unit cell having an ion exchange membrane used in the present invention.

In these diagrams, indicated at reference numeral 1 is a cation exchange membrane, 2 an anion exchange membrane, 3 a gas diffusion layer, 4 a gas channel (fuel gas), 5 a gas channel (oxidizing gas), 6 a separation zone, 7 a catalyst layer (as a hydrogen electrode), 8 a catalyst layer (as an oxygen electrode), 9 an interconnector, 10 a load and 11 an ion exchange membrane.

DETAILED DESCRIPTION OF THE PREFERRED EMBODIMENTS

Provided in the present invention is a self-water-circulating fuel cell system formed of unit cells each having two ion exchange membranes. In the present invention, an anion exchange membrane is employed in addition to a cation exchange membrane (proton exchange membrane).

In the portion of a cell at which the cation exchange membrane is disposed, the following reaction proceeds:

Hydrogen electrode: $H_2 \rightarrow 2H^+ + 2e^-$

Oxygen electrode: $\frac{1}{2}O_2 + 2H^+ + 2e^- \rightarrow H_2O$

In the portion of a cell at which the anion exchange membrane is disposed, the following reaction proceeds:

Hydrogen electrode: $H_2 + 2OH^- \rightarrow 2H_2O + 2e^-$

Oxygen electrode: $\frac{1}{2}O_2 + H_2O + 2e^- \rightarrow 2OH^-$

In one cell, the electrode of an anion exchange membrane and the electrode of a cation exchange membrane are disposed adjacent each other and a gas diffusion layer common to them is disposed on the outer side of each of the electrodes. These two electrodes are disposed so as not to be in contact each other. This diffusion layer, which is ordinarily made of carbon paper, is a current carrying layer which passes therethrough electrons generated on the catalyst. Outside this diffusion layer, an interconnector having therein a gas channel is disposed. This interconnector is a current carrier and has a function of separating a fuel gas from an oxidizing gas. By connecting the cell with an external load at the cation exchange membrane, a hydrogen gas is decomposed into protons and electrons at the hydrogen electrode and they move through the electrolytic membrane toward the oxygen electrode side. At this time, the protons move in clusters, together with water molecules near the protons. This is so called electroendosmosis and by this phenomenon, the membrane at the hydrogen electrode side dries out.

The ions moving in the anion exchange membrane are $OH^-$ ions as shown in the above reaction scheme and here, the ion transferring direction is opposite to that of the ions moving in the cation exchange membrane. Water is generated at the hydrogen electrode and in addition, electroendosmosis by $OH^-$ ions occurs here so that the moisture concentration gradient is reversal to that of the cation exchange membrane.

The hydrogen gas and oxygen gas flow through these exchange membranes alternately and water thus generated can be recycled.

As a cation exchange membrane, Nafion (trade mark) is for example usable in the present invention. As the anion exchange membrane, any heat-resistant polymer having an anionic group is usable. Although there is no particular limitation imposed on the anion exchange membrane, a polymer compound such as TOSFLEX (trade mark) is suitably employed.

One of the most simplified examples of the disposal in the fuel cell system according to the present invention is illustrated in FIG. 1.

In this example, a cation membrane 1 and an anion membrane 2 are vertically disposed and a gas is fed to each of gas channels 4,5 disposed on the outside of the membranes. The cation exchange membrane 1 is not brought into contact with the anion exchange membrane 2 and between them, a separation zone 6 is disposed as a space. When the cation exchange membrane 1 is disposed above the anion exchange membrane 2, for example, a hydrogen gas must be introduced from the lower portion of the gas channel. Since the cation exchange membrane 1 is disposed on the upper side, electroendosmotic water and product water flow downwards through the diffusion layer 3. By making use of these waters, a reaction at the lower anion exchange membrane occurs. Since the hydrogen gas must be humidified by the reaction at the upper cation membrane 1, it recycles water in such a way that the moisture obtained in the lower anion membrane is fed upward. The oxygen gas on the other hand recycles water obtained at the cation membrane 1. In the present invention, the disposal of these membranes are therefore not limited to vertical one but can be determined as needed according to the gas feeding direction.

FIG. 2 illustrates another embodiment of the present invention including the layout of a gas channel and exchange membrane. FIG. 2(a) illustrates a disposal example wherein one gas channel crosses the anion exchange membrane 2 and cation exchange membrane 1 at plural points, while FIG. 2(b) illustrates a disposal example wherein plural anion exchange membranes 2 and plural cation exchange membranes 1 are disposed alternately on the same plane and plural gas channels cross this plane. The thickness of each of the cation exchange membrane and anion exchange membrane is not particular limited but can be determined freely. It preferably falls within a range of about 10 $\mu$m to 1.0 mm from the viewpoints of the efficiency of electrode reaction or stacking ease of cells.

Figure 3:
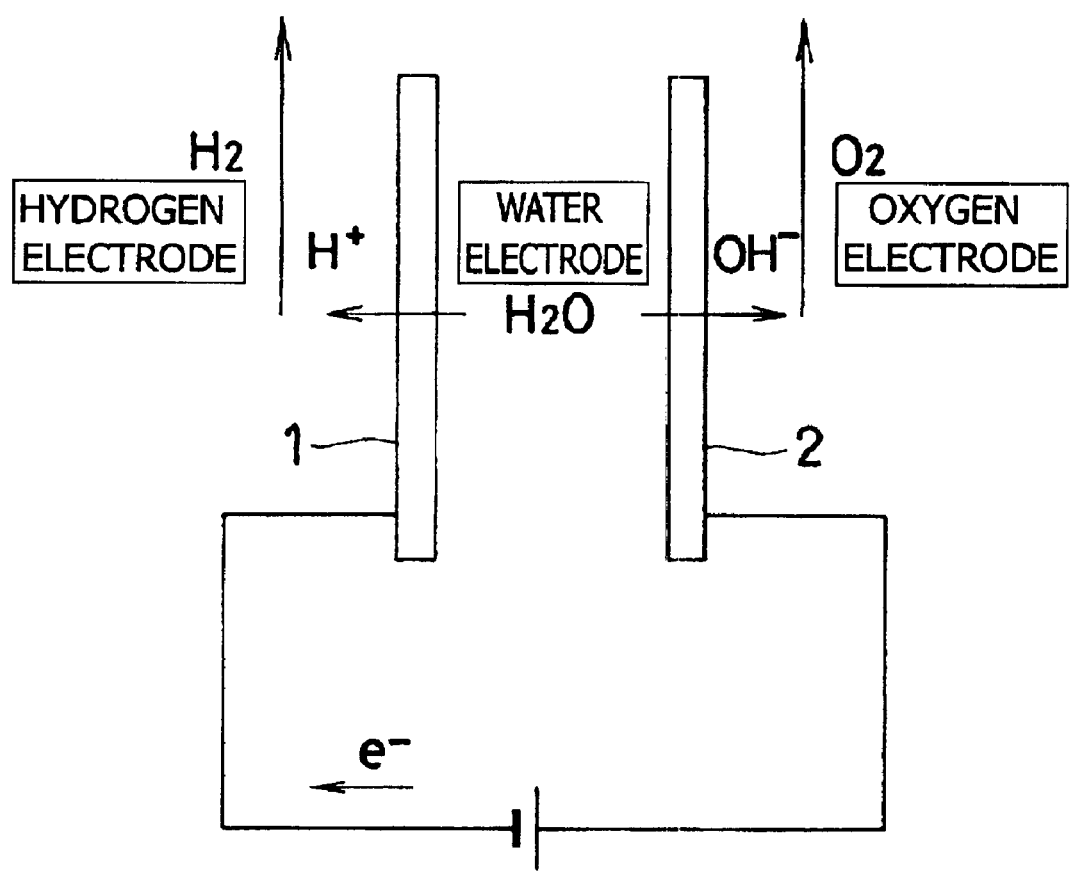
FIG. 3 is a schematic view illustrating electroendosmosis of water when the present invention is applied.
Figure 4:
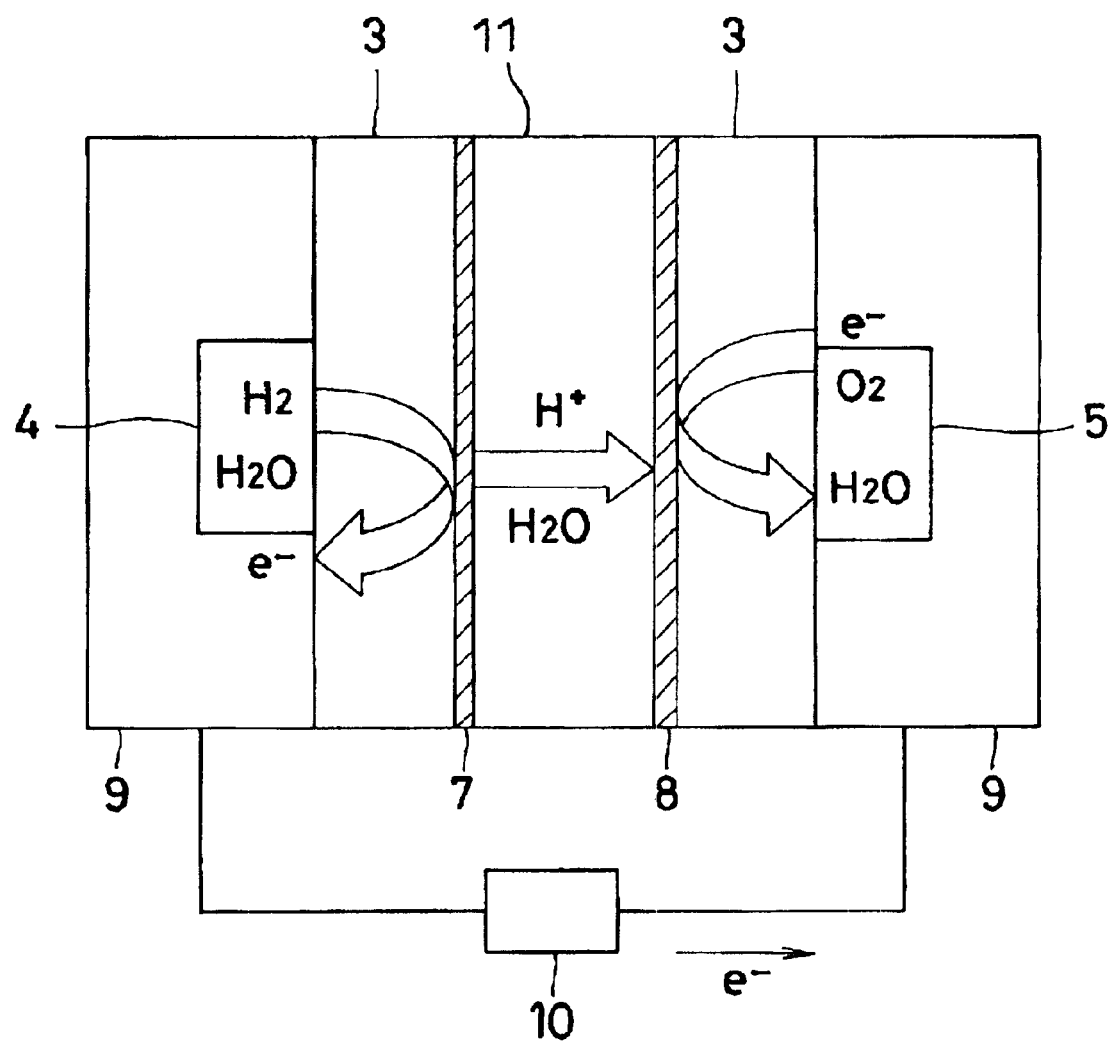
FIG. 4 is a schematic view illustrating layer constitution and action of one unit cell of the fuel cell system.

FIG. 3 schematically illustrates electrolysis of water when the fuel cell of the present invention is employed.

In the fuel cell system of the present invention, unit cells wherein ion exchange membranes are disposed as described above are employed as a fundamental constitution and a stack is formed by stacking these cells one after another via an interconnector.

Described specifically, the ion exchange membrane has, on the both sides thereof, catalyst layers coated with a platinum catalyst or the like and on the outside of these catalyst layers, a hydrogen electrode and oxygen electrode are disposed, respectively. For these electrodes, a carbon member such as carbon paper or carbon cloth is ordinarily employed. A unit cell is formed of this ion exchange membrane sandwiched between the hydrogen electrode and oxygen electrode and they are adhered other by contact bonding press.

On both sides of the unit cell, an interconnector 9 having a channel for reactant gas is disposed. These members are integrated into one fuel cell body. The fuel cell/interconnector combinations are stacked into a fuel cell stack. When one cell has an electromotive power of 1 V, for example, a stack formed of 100 cells generates about 100V of power.

This interconnector is required to have, as a principal performance, electron conductivity permitting transfer of electrons and in addition, has a structure facilitating feeding of electrodes with hydrogen and oxygen. On one plane of the interconnector, that is, a side to be brought into contact with the hydrogen electrode, a gas channel for feeding hydrogen is equipped, while on the other plane, that is, the side to be brought into contact with the oxygen side, a gas channel for feeding oxygen is equipped. These gas channels make it possible to allow gases to flow therethrough, thereby supplying the hydrogen electrode and oxygen electrode with a fuel gas and oxidizing gas, respectively. The thickness of the interconnector is determined as needed, but is usually about 1.0 to 3.0 mm. As a material for the interconnector, that having a compressive strength maintained to exceed a predetermined value can be selected. It is necessary to be able to increase a pressure on the material, while maintaining its electrical conductivity.

As an oxidizing gas, air can usually be introduced as it is. The fuel gas can be fed by various methods and no particular limitation is imposed thereon. For example, usable is a method of converting a raw material such as methanol into hydrogen in accordance with water vapor modifying reaction by using a hydrogen producing apparatus and supplying the resulting hydrogen after purification through a hydrogen purifying apparatus or the like.

The fuel cell system according to the present invention does not need auxiliary equipment such as humidifier, leading to system simplification due to a reduction in the number of apparatuses, cost reduction and saving of the space.

In this fuel cell system of the present invention, an externally fed gas is free from the influence of a water vapor partial pressure added by humidification. In addition, this system can prevent a decrease in an effective electrode area due to excessive increase of water in the cell and at the same time, by its self humidifying system, water can be fed to a reactant gas.

The embodiments of the present invention were so far described. They are provided only for facilitating the understanding of the present invention but not for limiting the scope of the present invention.

What is claimed is:

1. A solid polymer fuel cell comprising a plurality of unit cells stacked one after another, said unit cell comprising an anion exchange membrane and a cation exchange membrane disposed adjacent but not in contact with one another wherein a separation zone is disposed between said anion exchange membrane and said cation exchange membrane, and wherein a catalyst layer and a hydrogen electrode is disposed on one side of said anion exchange membrane and a catalyst layer and an oxygen electrode is disposed on the other side of said anion exchange membrane, wherein a catalyst layer and a hydrogen electrode is disposed on one side of said cation exchange membrane and a catalyst layer and an oxygen electrode is disposed on the other side of said cation exchange membrane, gas diffusion layers commonly disposed on both sides of said anion exchange membrane and said cation exchange membrane for allowing electrons generated on each of the catalyst layers of the hydrogen electrode and the oxygen electrode to pass, and a gas channel disposed outside said gas diffusion layers and which crosses the portion of the gas diffusion layers contiguous to said anion exchange membrane and the portion of the gas diffusion layers contiguous to said cation exchange membrane so as to connect both of the portions, in which the gas channel on one side of said membranes is for feeding hydrogen to the hydrogen electrode while the gas channel on the other side is for feeding oxygen to the oxygen electrode, wherein said gas channel is disposed on an interrconnector.

2. The fuel cell according to claim 1, wherein the anion exchange membrane comprises a heat-resistant polymer having an anionic group.

3. The fuel cell according to claim 1, wherein the anion exchange membrane comprises a perfluorinated anion exchange membrane.

4. The fuel cell according to claim 1, wherein the cationic exchange membrane comprises a perfluorinated cation exchange membrane.

5. The fuel cell according to claim 1, wherein at least one of said gas diffusion layers comprises carbon paper.

6. The fuel cell according to claim 1, wherein the cation exchange membrane and the anion exchange membrane are vertically disposed relative to each other.

7. The fuel cell according to claim 1, wherein the gas channel crosses the cation exchange membrane and the anion exchange membrane at a plurality of points.

8. The fuel cell according to claim 1, wherein the plurality of unit cells of said fuel cell are stacked one after another such that the anion exchange membranes and the cation exchange membranes of the fuel cell are alternately disposed in the same plane.

9. The fuel cell according to claim 8, wherein said fuel cell comprises a plurality of gas channels which cross the plane on which the anion exchange membranes and cation exchange membranes are alternately disposed.

10. A solid polymer fuel cell comprising a plurality of unit cells stacked one after another, said unit cell comprising an anion exchange membrane comprising a heat resistant polymer having an anionic group and a cation exchange membrane disposed adjacent but not in contact with one another wherein a separation zone is disposed between said anion exchange membrane and said cation exchange membrane, and wherein a catalyst layer and a hydrogen electrode is disposed on one side of said anion exchange membrane and a catalyst layer and an oxygen electrode is disposed on the other side of said anion exchange membrane, wherein a catalyst layer and a hydrogen electrode is disposed on one side of said cation exchange membrane and a catalyst layer and an oxygen electrode is disposed on the other side of said cation exchange membrane, gas diffusion layers commonly disposed on both sides of said anion exchange membrane and said cation exchange membrane for allowing electrons generated on each of the catalyst layers to pass, and a gas channel disposed outside said gas diffusion layers and which crosses the portion of the gas diffusion layers contiguous to said anion exchange membrane and the portion of the gas diffusion layers contiguous to said cation exchange membrane so as to connect both of the portions, in which the gas channel at one side of said membranes is for feeding oxygen to the oxygen electrode, wherein said gas channel is disposed on an interrconnector.

11. The fuel cell according to claim 10, wherein the anion exchange membrane comprises a perfluorinated anion exchange membrane.

12. The fuel cell according to claim 10, wherein the cationic exchange membrane comprises a perfluorinated cation exchange membrane.

13. The fuel cell according to claim 10, wherein at least one of said gas diffusion layers comprises carbon paper.

14. The fuel cell according to claim 10, wherein the cation exchange membrane and the anion exchange membrane are vertically disposed relative to each other.

15. The fuel cell according to claim 10, wherein the gas channel crosses the cation exchange membrane and the anion exchange membrane at a plurality of points.

16. The fuel cell according to claim 10, wherein the plurality of unit cells of said fuel cell are stacked one after another such that the anion exchange membranes and the cation exchange membranes of the fuel cell are alternately disposed in the same plane.

17. The fuel cell according to claim 16, wherein said fuel cell comprises a plurality of gas channels which cross the plane on which the anion exchange membranes and cation exchange membranes are alternately disposed.

* * * * *